(12) United States Patent
Kalm et al.

(10) Patent No.: US 11,649,848 B1
(45) Date of Patent: May 16, 2023

(54) FRICTION VACUUM SUCTION CUP

(71) Applicant: Amazon Technologies, Inc., Seattle, WA (US)

(72) Inventors: William Scott Kalm, Seattle, WA (US); Bob Samac, Cle Elum, WA (US); Tait Stephen Carroll, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/499,148

(22) Filed: Oct. 12, 2021

(51) Int. Cl.
*F16B 47/00* (2006.01)

(52) U.S. Cl.
CPC .................................. *F16B 47/00* (2013.01)

(58) Field of Classification Search
CPC ........................................................ F16B 47/00
USPC .......... 248/683, 537, 205.5, 309.3, 362, 363
See application file for complete search history.

(56) References Cited

U.S. PATENT DOCUMENTS

| | | | |
|---|---|---|---|
| 2,688,220 A | 9/1954 | Boutell | |
| 8,251,415 B2 * | 8/2012 | Lomerson, Jr. | B25J 15/0616 294/2 |
| 9,145,913 B2 * | 9/2015 | Song | F16B 47/00 |
| 9,746,022 B2 * | 8/2017 | Shi | F16B 47/00 |
| 11,493,080 B1 * | 11/2022 | Kalm | F16B 47/00 |
| 2003/0120387 A1 * | 6/2003 | Sherwin | B25J 15/0052 294/2 |
| 2005/0168001 A1 * | 8/2005 | Perlman | B25J 15/0616 294/189 |
| 2006/0231705 A1 * | 10/2006 | Liu | F16B 47/00 248/205.5 |
| 2015/0330438 A1 * | 11/2015 | Shi | F16B 47/006 248/205.8 |
| 2020/0346354 A1 * | 11/2020 | Su | F16M 11/24 |
| 2021/0075256 A1 * | 3/2021 | Hur | F16C 11/06 |
| 2022/0145928 A1 * | 5/2022 | Tolley | B25J 15/0616 |

OTHER PUBLICATIONS

U.S. Appl. No. 17/499,137, filed Oct. 12, 2021, Titled: Elliptical Vacuum Suction Cup.

* cited by examiner

*Primary Examiner* — Muhammad Ijaz

(74) *Attorney, Agent, or Firm* — Kilpatrick Townsend & Stockton LLP

(57) ABSTRACT

A suction cup can include a body and a skirt connected to a periphery of the body. The body can include an engagement surface with an aperture. A friction material can be positioned on the engagement surface for engagement with a container. A channel can extend along the engagement surface between the aperture and a periphery of the body.

20 Claims, 8 Drawing Sheets

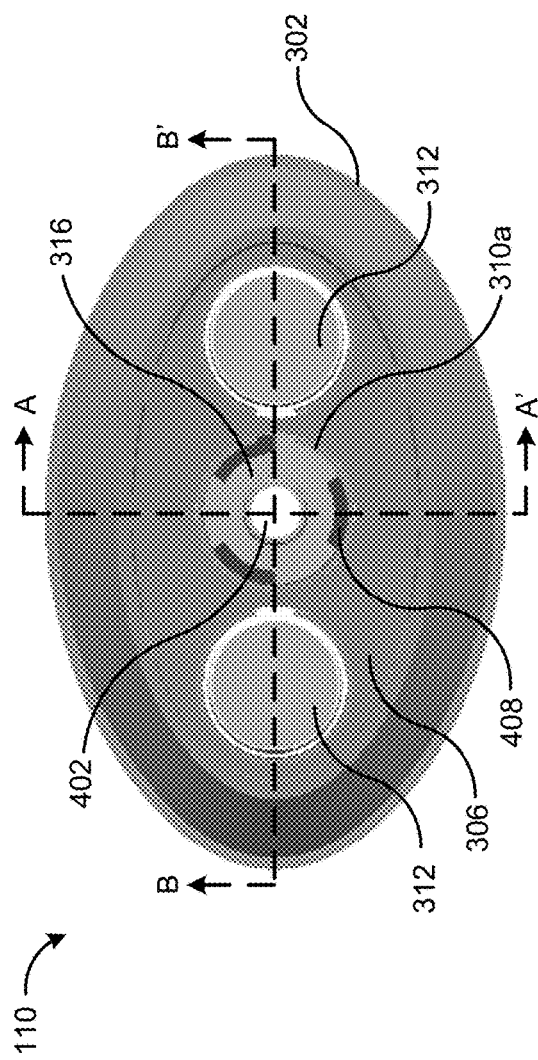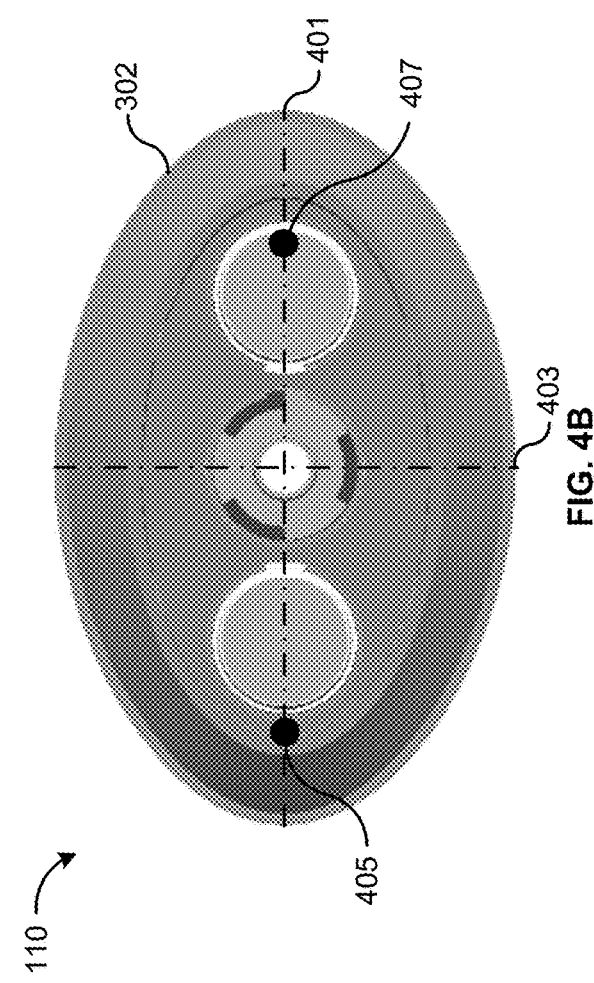

FRICTION VACUUM SUCTION CUP

BACKGROUND

Inventory systems, such as those in warehouses, supply chain distribution centers, airport luggage systems, and custom-order manufacturing facilities, face significant challenges in storing inventory items. As the amount of inventory moved through the inventory systems increases, inefficient movement of the inventory can result in lower throughput, unacceptably long response times, an ever-increasing backlog of unfinished tasks, and, in general, poor system performance. Additionally, the inventory can include containers having different shapes and sizes that can be difficult to move using traditional manipulation devices.

BRIEF DESCRIPTION OF THE DRAWINGS

Various embodiments in accordance with the present disclosure will be described with reference to the drawings, in which:

FIGS. 4A and 4B are front views of the example suction cup of FIG. 3, according to various embodiments;

DETAILED DESCRIPTION

Figure 1:
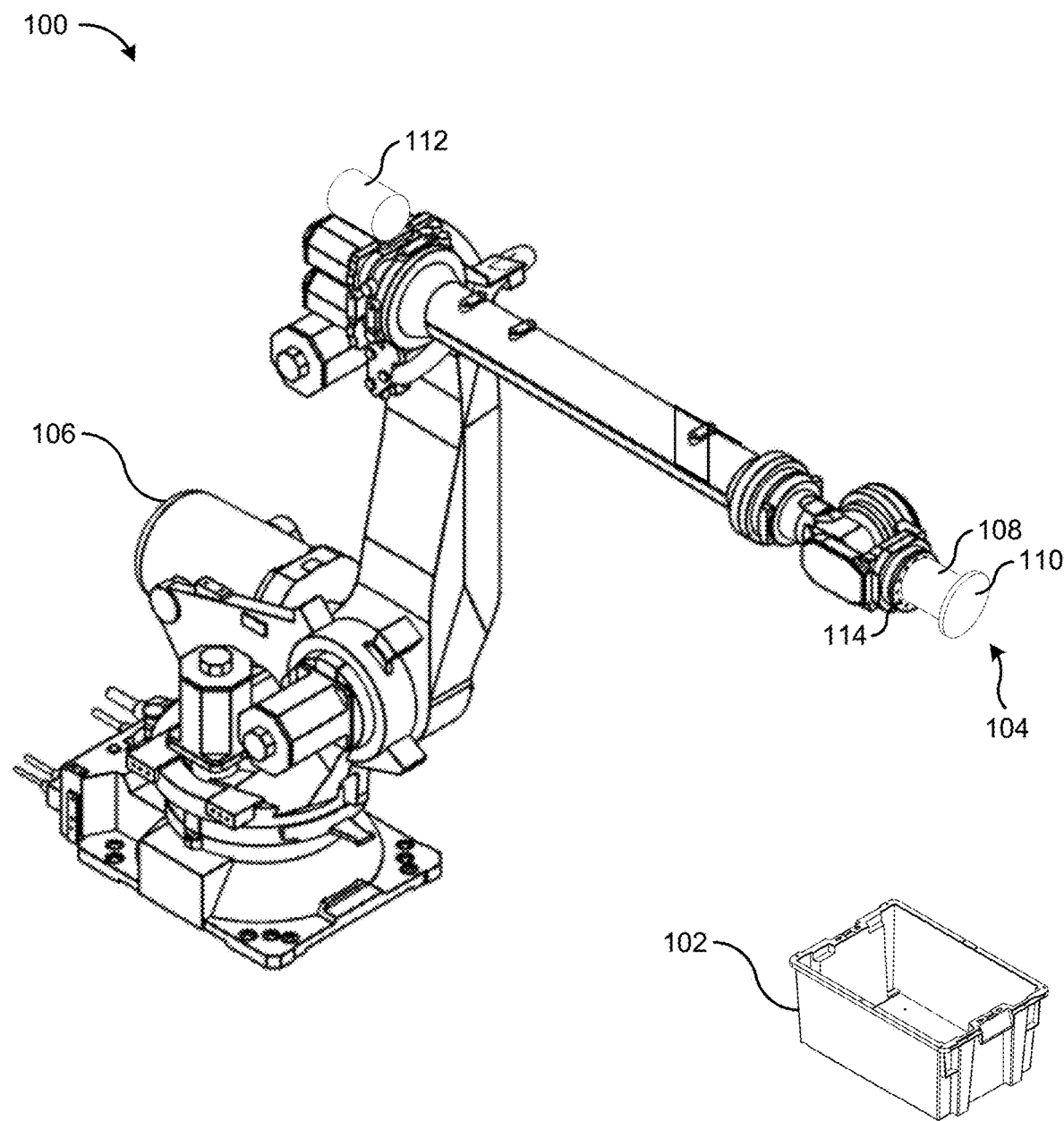
FIG. 1 illustrates a container manipulation system for moving containers, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a container manipulation system for moving containers. The techniques described herein may be implemented by any suitable container management system, but particular examples are described that can include a container manipulation device and a vacuum suction cup. The container manipulation device can position the suction cup for engagement with a container. The vacuum suction cup can have an elliptical shape (e.g., an elliptical cross-section with a major axis and a minor axis). The elliptical shape can allow the vacuum suction cup to attach to a rectangular area of the container. For example, the container can have an attachment area with a smaller height than width.

The vacuum suction cup can include a skirt positioned around the periphery of an engagement plate. The skirt can include an edge (e.g., a lip) that can be positioned against the side of the container. The engagement plate can include one or more openings and an engagement surface. The engagement surface can be and/or include a friction material (e.g., a high-friction material). The openings can extend some or all of the way through the engagement plate (e.g., from the engagement surface to an opposing side of the engagement plate). The openings can be arranged, for example, along the major axis of the ellipse. The one or more openings can allow air to flow from between the engagement plate and the container when the skirt is positioned against the container. The flowing of the air from between the engagement plate and the container can generate suction. The suction can cause the skirt to compress and/or the engagement plate to engage with the container.

Turning now to a particular example, in this example the vacuum suction cup can include a skirt, an engagement plate, and a stem. The engagement plate can have an elliptical cross-section (e.g., an elliptical shape with a major axis and a minor axis). The engagement plate can include one or more apertures (e.g., conduits extending some or all of the way between two opposing surfaces of the engagement plate). The apertures can be connected (e.g., by passages) such that air can flow between the apertures. The skirt can be connected to a periphery of the engagement plate (e.g., such that the skirt has an elliptical shape). The skirt can include a lip that can engage with a side of the container. The stem can be positioned in one of the apertures. The stem can be coupled with the engagement plate (e.g., at a first end of the stem) such that the engagement plate can pivot relative to the stem. A second end of the stem can be coupled with a vacuum source. The one or more apertures can flow air from between the engagement plate and the side of the container when the skirt is engaged with the side of the container. The flowing of the air can generate suction between the engagement plate and the side of the container. The suction can cause one side of the engagement plate to engage with the side of the container.

Turning now to another example, in this example the vacuum suction cup can include an engagement plate and a skirt. The engagement plate can include one or more apertures and an engagement surface. The engagement surface can engage with a side of a container. The engagement surface can include friction material (e.g., high-friction material) and channels. The friction material can have a higher coefficient of friction than the coefficient of friction between the engagement surface and the container. The higher coefficient of friction can increase the lifting force of the vacuum suction cup. For example, friction material can increase the amount of shear force that can be resisted before the container starts to slip (e.g., before the container starts to move relative to the vacuum suction cup).

The channels can extend from one or more of the apertures to a periphery of the engagement surface. The skirt can be coupled with the periphery of the engagement plate and include a lip. The lip can engage with the surface of the container. When the lip is engaged with the surface of the container, air can flow from the periphery of the engagement surface through the aperture via the channels (e.g., can flow through the channels and through the aperture). The flowing air can cause suction between the container and the engagement surface. The suction can cause the skirt to compress and/or the engagement surface to engage with the container.

Turning now to the figures, FIG. 1 illustrates a container manipulation system 100 for moving containers 102, according to at least one example. As described herein, the manipulation system 100 can include a suction cup assembly 104 (e.g., a vacuum suction cup assembly) attached to a container manipulation device 106. The suction cup assembly 104 can include an actuator 108 (e.g., a linear actuator) and a suction cup 110 (e.g., a vacuum suction cup). The container manipulation device 106 can position the suction cup assembly 104 for engaging with the containers 102. For example, the container manipulation device 106 can align the suction cup 110 with an engagement area of a container 102. In various embodiments, the actuator 108 can extend (e.g., from the container manipulation device 106) to engage the suction cup 110 with the container 102.

When the suction cup 110 is engaged with the container 102, the air between the suction cup 110 and the container 102 can be removed, for example, by a pump 112. The removal of the air from between the suction cup 110 and the container 102 can create a vacuum hold and/or a pressure differential, for example, by lowering the air pressure between the suction cup 110 and the container 102 below the pressure outside of the suction cup 110 (e.g., below the atmospheric pressure). The vacuum hold can be created by removing some or all of the air from between the suction cup and the container (e.g., forming a vacuum between the suction cup and the container). Vacuum referenced herein refers to both a partial vacuum (e.g., where the air pressure is reduced by less than 100%) and a perfect vacuum (e.g., where the air pressure is reduced by 100%). The vacuum hold between the suction cup 110 and the container 102 can generate a holding force. The holding force can be up to 100 pounds (e.g., the holding force can allow the suction cup 110 to pick up a container 102 (e.g., the container 102 and any items positioned within the container) weighing up to 100 pounds. The holding force can allow the container manipulation device 106 and/or the actuator 108 to move the container 102. For example, the holding force can allow the actuator 108 to retract and pull the container 102 from a container location (e.g., a shelf and/or a slot). The container 102 can be moved to another location (e.g., to another location in a warehouse environment).

The container manipulation device 106 can be or include a robotic arm moveable along multiple axes. For example, the robotic arm can be moveable along six-axes, although any other suitable number greater than or less than six could alternatively be utilized. The container manipulation device 106 can include one or more attachment points and/or connectors. For example, the container manipulation device 106 can include an attachment point 114 for attaching the suction cup assembly 104 (e.g., the actuator 108 and/or the suction cup 110).

In some embodiments, the container manipulation device 106 can be positioned at a stationary point in a warehouse environment. However, the container manipulation device 106 may be moveable around the warehouse environment, either under its own power and/or under the power of another device.

In various embodiments, the actuator 108 can be or include a linear actuator. The actuator 108 can be connected to the container manipulation device 106 (e.g., at the attachment point). The actuator 108 can move the suction cup assembly 104 between a stage position and an engaged position. In the engaged position, the actuator 108 can extend the suction cup assembly 104 away from the container manipulation device 106 to engage with the container 102.

In some embodiments, the pump 112 can be positioned on the container manipulation device 106. For example, the pump 112 can be positioned on the container manipulation device 106 and attached to the suction cup 110 via a hose. However, the pump 112 can be separate from the container manipulation device 106. In further embodiments, the pump 112 can be a component of the container manipulation device 106 (e.g., pump 112 can be part of the container manipulation device 106 and used with one or more of the components of the container manipulation device 106). For example, the suction cup 110 can be connected to the pump 112 via a connector (e.g., a connector positioned at the attachment point of the container manipulation device 106). The pump 112 can be or include a vacuum, a vacuum pump, a vacuum ejector, a blower, a pump, and/or any suitable device for moving air.

Figure 2A:
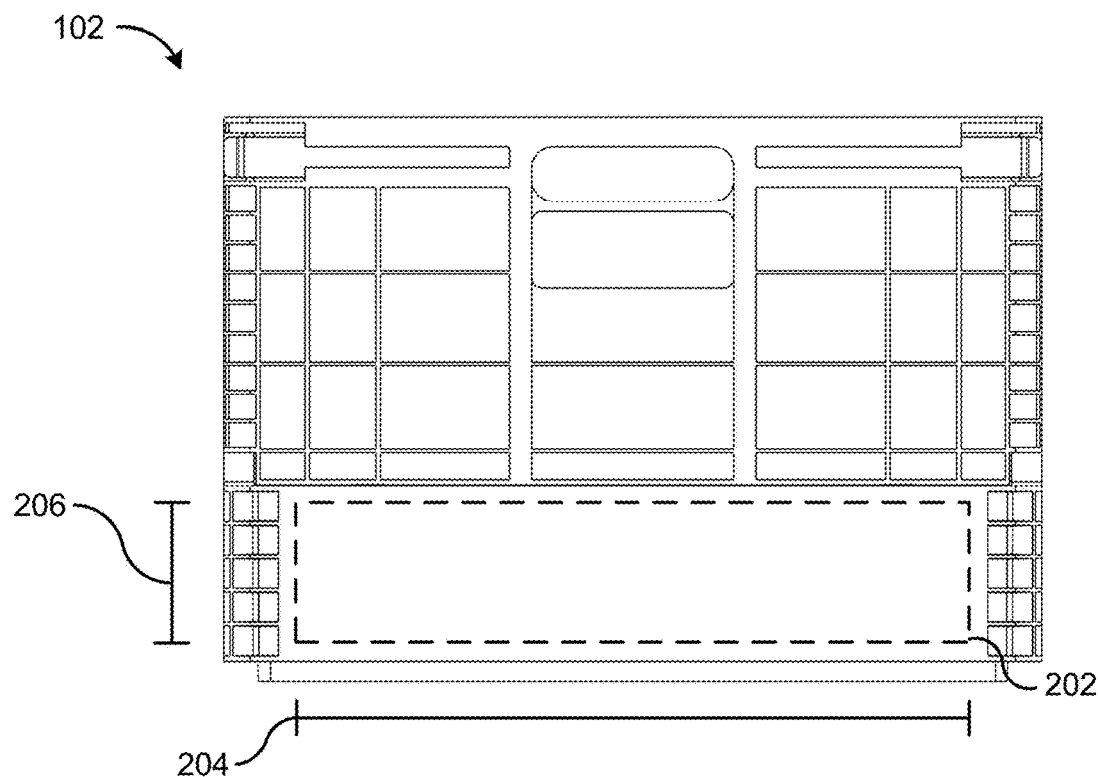
FIGS. 2A and 2B illustrate example containers for use with the container manipulation system of FIG. 1, according to various embodiments.
Figure 2B:
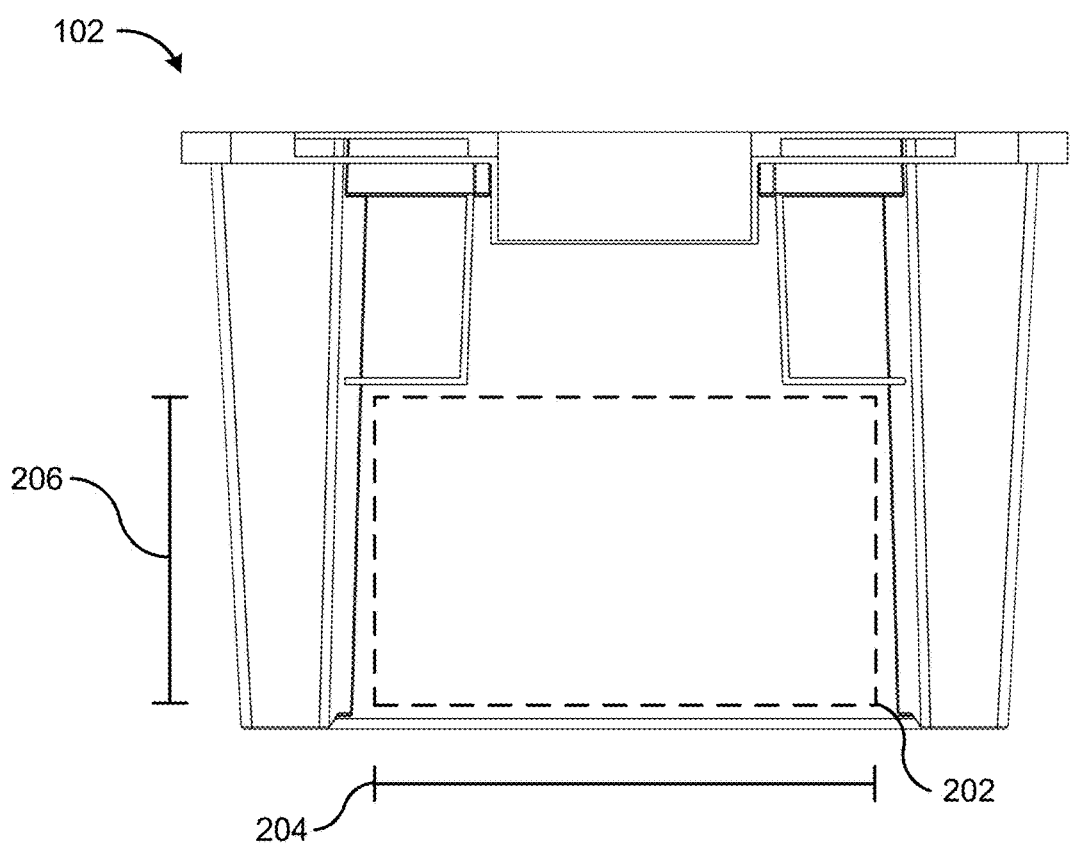

Turning to FIGS. 2A and 2B, example containers 102 for use with the container manipulation system 100 of FIG. 1 are shown. The containers 102 can be or include a container or a bin with an interior area for containing one or more items. The containers 102 may include rigid or semi-rigid material, for example, plastic, cardboard, paper, or any suitable material for containing items. In various embodiments, the containers 102 may be items, e.g., such that the items are moved by the suction cup assembly 104 without first being positioned in a container 102. In further embodiments, the containers 102 can be or include a plate (e.g., a flat plate). The plate can be or include a flat or semi-flat surface where the suction cup 110 can attach.

In various embodiments, the containers 102 can include an engagement area 202. The engagement area 202 can be or include a surface where the suction cup 110 can engage with the container 102. For example, the engagement area 202 can include a portion of the container free of seams, protrusions, gaps, and/or other features that can prevent the suction cup 110 from forming a vacuum hold between the container 102 and the suction cup 110. The containers 102 can additionally or alternatively include handles, hooks, or other features and/or components for engaging with the suction cup assembly 104.

As shown in FIG. 2A, the engagement area 202 can be a non-square, rectangular area (e.g., an area having a length and height that are different sizes). For example, the engagement area 202 can have a length 204 that is greater than a height 206. The engagement area 202 can have a length 204 between 75 mm and 150 mm and a height 206 between 50 mm and 100 mm in some embodiments. For example, the engagement area 202 can have a length 204 of 105 mm and a height 206 of 70 mm. The dimensions of the engagement area 202 (e.g., the length 204 and/or the height 206) can limit the size of the suction cup 110 that can be used. For example, if the suction cup 110 has a circular cross-section, the diameter of the suction cup 110 has to be smaller than the smaller dimension of the engagement area 202 (e.g., so that the suction cup 110 can attach to the engagement area 202 without extending outside of the engagement area 202). A smaller suction cup 110 can have a smaller holding force than a larger suction cup 110.

Figure 3:
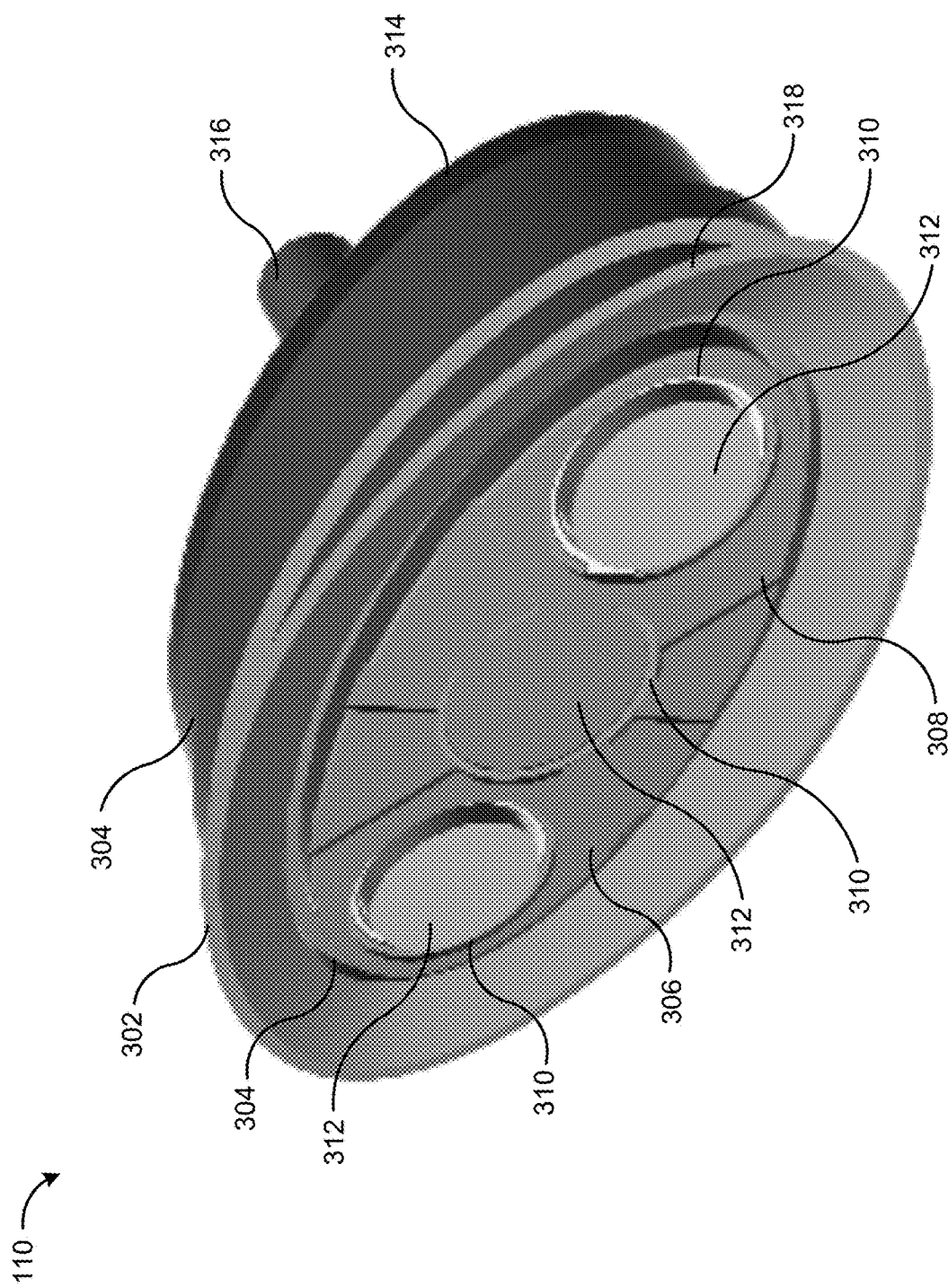
FIG. 3 is a perspective view of an example suction cup for use with the container manipulation system of FIG. 1, according to various embodiments.

As described herein, for example in reference to FIG. 3, the suction cup 110 can have an elliptical cross-section. The elliptical cross-section can maximize the area of the suction cup 110 that can fit in the non-square, rectangular engagement area 202. The larger area of the suction cup 110 can have a larger holding force compared with a round suction cup that can fit in the same engagement area 202. For example, the elliptical cross-section can include a major axis and a minor axis. The major axis can be similar to the length 204 of the engagement area 202 (e.g., the same as or slightly smaller than) and the minor axis can be similar to the height 206 of the engagement area 202 (e.g., the same as or slightly smaller than).

As an illustrative example, the engagement area 202 can have a length 204 of 105 mm and a height of 70 mm. The suction cup 110 with an elliptical cross-section can have a major axis of 105 mm (e.g., equal to the larger dimension) and a minor axis of 70 mm (e.g., equal to the smaller dimension) which results in an area of 23090.71 square mm. The suction cup 110 with a circular cross-section can have a diameter of 70 mm (e.g., equal to the smaller dimension) which results in an area of 3848.45 square mm. The larger area results in a larger holding force and can allow the suction cup assembly 104 to pick up heavier containers 102 (e.g., heavier containers 102 and/or containers 102 filled with heavier and/or more items).

FIG. 2B shows another container 102 with a different sized engagement area 202. For example, the engagement area 202 of the container 102 of FIG. 2B can have a larger height 206 and a smaller length 204. The size of the suction cup 110 may be dependent on the dimensions (e.g., the height 206 and the length 204) of both of the engagement areas 202 of FIGS. 2A and 2B. For example, the suction cup 110 can have a major axis that is less than or equal to the length 204 of the engagement area 202 of FIG. 2B and a minor axis that is less than or equal to the height 206 of the engagement area 202 of FIG. 2A. The suction cup 110 having dimensions that can fit into the smallest dimensions of each of the containers 102 of FIGS. 2A and 2B can allow the suction cup 110 to engage with both containers 102 without having to switch the suction cup 110.

Turning to FIG. 3, a perspective view of an example suction cup 110 for use with the container manipulation system 100 is shown. The example suction cup 110 can have an elliptical cross-section with a major axis that is larger than a minor axis. As shown in FIG. 4B, the major axis can be line 401 and the minor axis can be line 403. The example suction cup 110 can include a skirt 302 positioned around a periphery of an engagement plate 304. The engagement plate 304 can include an engagement surface 306. The engagement surface 306 can include channels 308 and one or more apertures 310. The channels 308 can extend from one or more of the apertures 310 to a periphery of the engagement surface 306. The apertures 310 can include openings in the engagement surface 306 that extend some or all of the way through the engagement plate 304.

In various embodiments, covers 312 can be positioned over one or more of the apertures 310. The covers 312 can be or include filters that prevent debris from going through the apertures 310. A back plate 314 can be connected to the engagement plate 304. For example, the back plate 314 can be connected to a side of the engagement plate opposite the engagement surface 306. A stem 316 can be connected to the engagement plate 304. As discussed herein, the stem 316 can include a conduit that aligns with one or more of the apertures 310. The stem 316 can be connected to the pump 112 to pull air through one or more of the apertures 310. For example, air can flow across the engagement surface 306 (e.g., through the channels 308), into one or more of the apertures 310, and through the stem 316.

The skirt 302 can be used to create the vacuum between the engagement plate 304 and the container 102. The skirt 302 can be part of the engagement plate 304 (e.g., a periphery of the engagement plate 304). However, the skirt 302 can be or include a separate component (e.g., one or more bellows) that can engage with the engagement plate 304. In some embodiments, the skirt 302 can be or include a lip 318 that can engage with the container 102. When the skirt 302 (e.g., the lip 318) is engaged with the container 102, air can be pulled from between the engagement plate 304 (e.g., the engagement surface 306) and the container 102 (e.g., through one or more of the apertures 310 and the stem 316) to generate the vacuum hold. The air can be pulled from between the engagement plate 304 and the container 102 using the pump 112. Pulling the air from between the engagement plate 304 and the container 102 can generate the vacuum hold (e.g., generate a vacuum and/or seal the skirt 302 against the container 102). The vacuum hold between the suction cup 110 and the container 102 can have a lower air pressure than the air pressure outside the suction cup 110 (e.g., lower than the atmospheric pressure). The lower air pressure in the sealed area can cause the skirt 302 to collapse. The collapsing skirt 302 can allow the engagement surface 306 to engage with the container 102. The skirt 302 can be or include rubber, nitro rubber, silicone, silicon, and/or any suitable compressible material. In various embodiments, the skirt 302 can be or include one or more bellows.

In various embodiments, the channels 308 of the engagement surface 306 can allow air to be pulled from the periphery of the engagement surface 306. For example, the channels 308 can allow air to be pulled from the periphery of the engagement surface 306 when the engagement surface 306 is positioned in contact against the container 102.

In some embodiments, the engagement surface 306 and/or the covers 312 can be or include friction material (e.g., high friction material). The friction material can increase the coefficient of friction between the engagement surface 306 and the container 102. For example, the coefficient of friction between the engagement surface 306 and the container 102 when the engagement surface 306 includes the friction material can be higher than the coefficient of friction between the engagement surface 306 and the container 102 when the engagement surface 306 does not include the friction material. The friction material can increase the amount of shear force the suction cup 110 can resist (e.g., the amount of downward force generated by the weight of the container 102). For example, without the friction material the suction cup 110 may be able to withstand up to 45 pounds of shear force. With the friction material (e.g., the friction material engaged with the container 102) the suction cup 110 may be able to withstand up to 100 pounds of shear force. The increase in shear force can be related to the composition of the friction material and/or the coefficient of friction between the friction material and the container 102. For example, a higher coefficient of friction between the friction material and the container 102 can increase the amount of shear force the suction cup 110 can resist (e.g. the amount of weight the suction cup 110 can lift).

The friction material can positioned along some or all of the engagement surface 306. For example, the friction material can be positioned on the non-channel portions of the engagement surface 306. However, the friction material can be positioned in the channels 208. In some embodiments, the friction material can be arranged in a pattern on the engagement surface 306. For example, areas of friction material can be positioned on the engagement surface 306.

The friction material can be or include plastic, phenolic material, bakelite, Polyoxybenzylmethylenglycolanhydride, high-grit material (e.g., sandpaper), ceramics, copper, steel, iron, rubber, cellulose, aramid, chopped glass, brass, silicon, silicone, and/or any material suitable to increase the coefficient of friction between the engagement surface 306 and the container 102.

In various embodiments, the engagement plate 304 and the engagement surface 306 can be a single piece of material. For example, the engagement plate 304 can be a solid body where one face is the engagement surface 306. However, the engagement plate 304 and the engagement surface 306 can be two separate pieces. For example, the engagement surface 306 can attach to the engagement plate 304. The engagement plate 304 and/or the engagement surface 306 can be or include plastic, metals including aluminum, steel, bronze, copper, rubber, silicon, silicone, carbon fiber, and/or any suitably strong material.

In some embodiments, the engagement plate 304, the engagement surface 306, and/or the covers 312 can include the friction material. For example, the engagement plate 304 and the engagement surface 306 can be machined from a solid piece of the friction material. However, the friction material may be formed as a layer of material that is positioned on one or more of the engagement plate 304, the engagement surface 306, and/or the covers 312. For example, the engagement surface 306 and/or the covers 312 can be coated and/or layered with the friction material.

Figure 5:
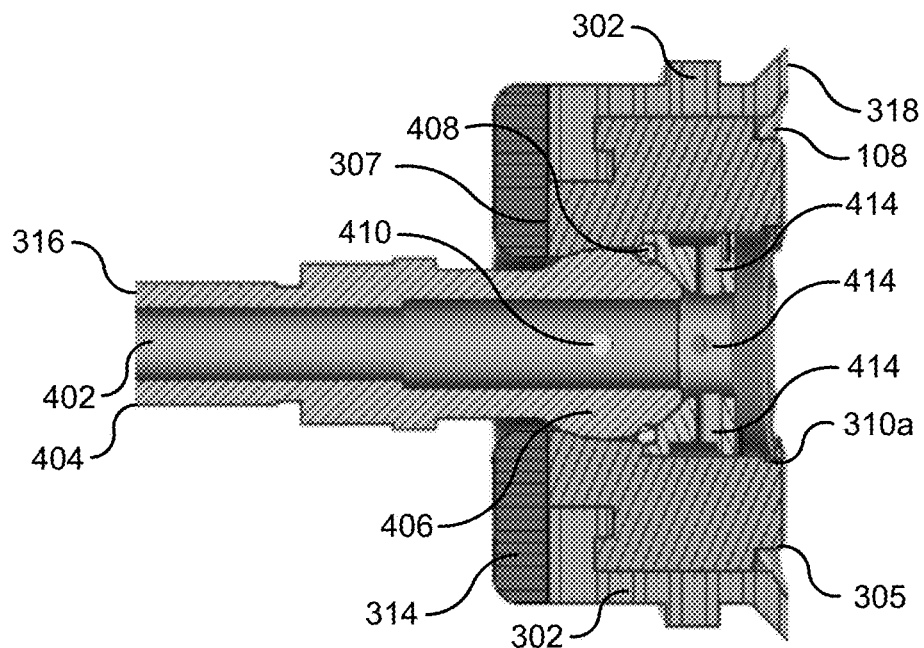
FIGS. 5 and 6 are cross-sectional views of the suction cup of FIG. 3, according to various embodiments.
Figure 6:
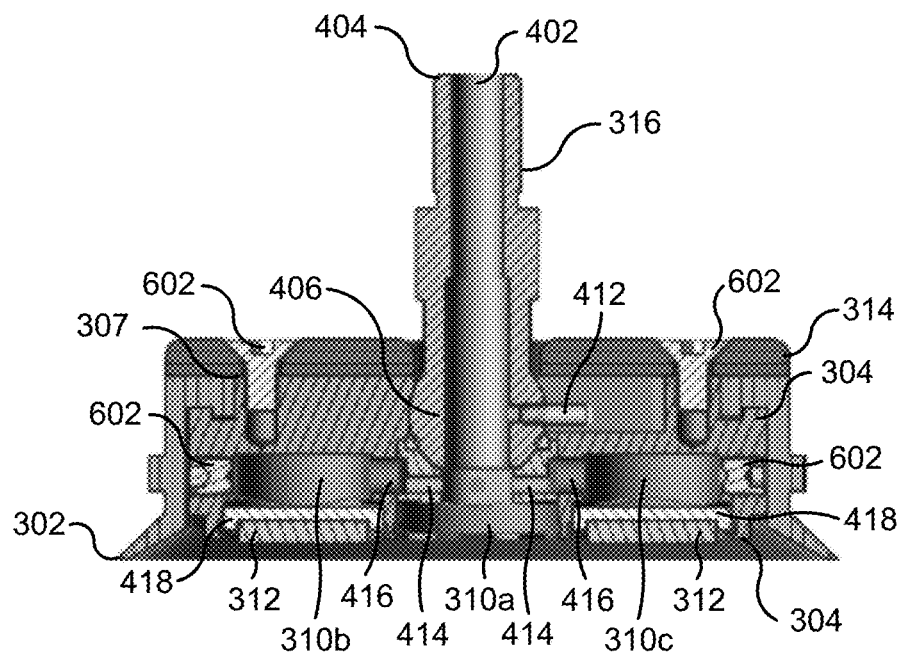
Figure 7:
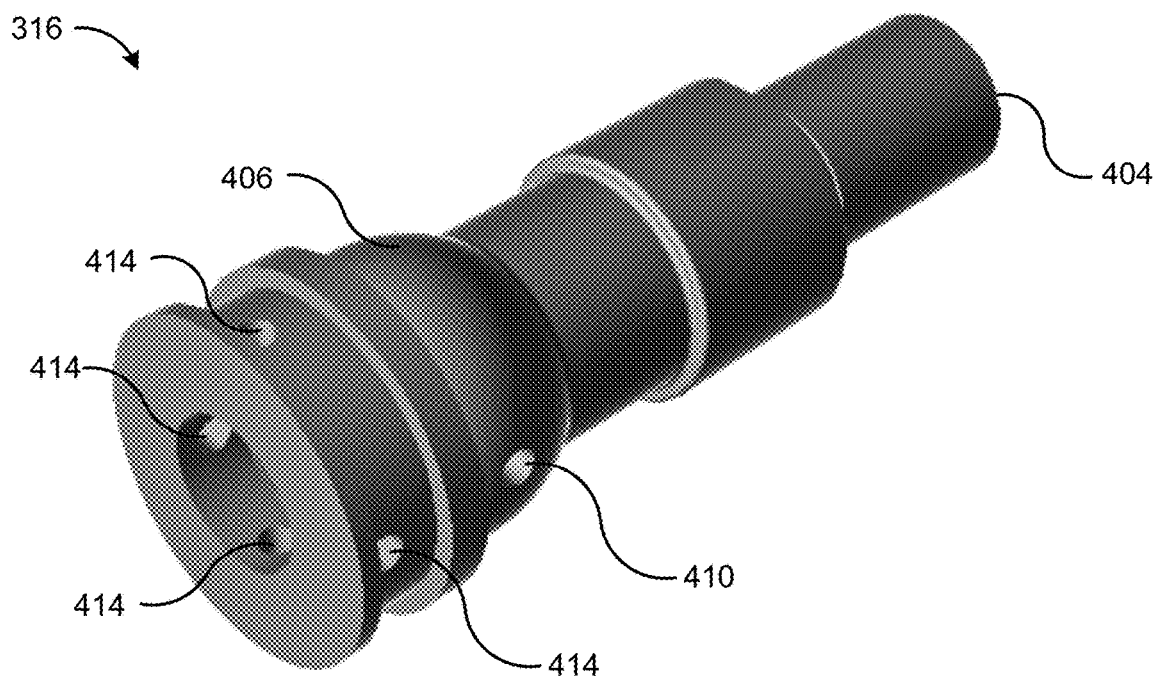
FIG. 7 is a perspective view of a stem for use with the suction cup of FIG. 3, according to various embodiments.
Figure 8:
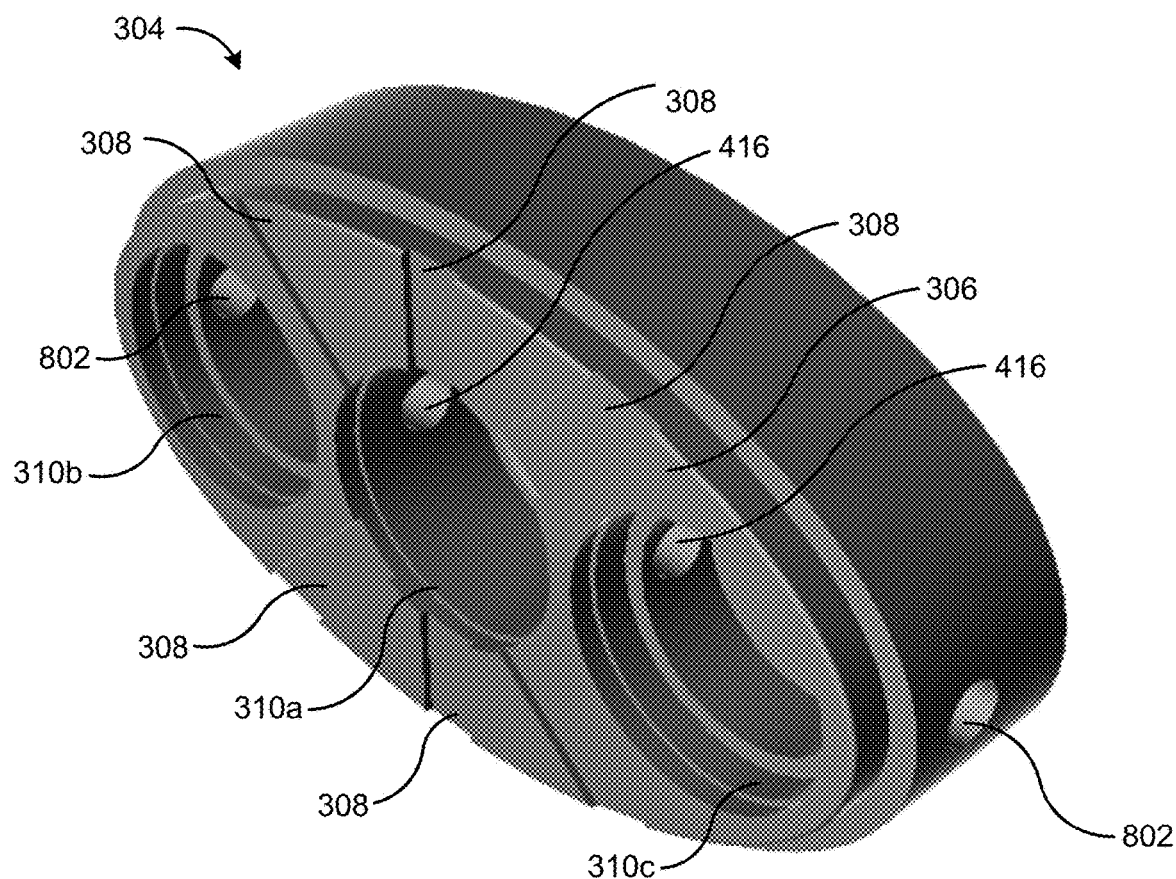
FIG. 8 is a perspective view of an engagement plate for use with the suction cup of FIG. 3, according to various embodiments.

Turning to FIGS. 4A through 8, another example suction cup 110 and associated components are shown. FIGS. 4A and 4B show a front view of the suction cup 110 with a cover 312 of a primary aperture 310a removed for ease of viewing. FIG. 5 is a cross-section of the suction cup 110 taken along line AA' in FIG. 4A, and FIG. 6 is a cross-section of the suction cup 110 taken along line BB' in FIG. 4A. FIG. 7 shows an example stem 316, and FIG. 8 shows an example engagement plate 304.

As shown in FIG. 4B, the suction cup 110 can have an elliptical cross-section. For example, the skirt 302 can have an elliptical shape with a major axis 401 (e.g., a transverse diameter) and a minor axis 403 (e.g., a conjugate diameter). The elliptical shape can be curved such that the sum of the distance between an arbitrary point on the ellipse and the foci of the ellipse (e.g., points 405 and 407) is equal to the major axis. The elliptical shape of the skirt 302 can allow the suction cup 110 to attach to containers 102 with an uneven and/or or rough surfaces. A suction cup 110 with a skirt 302 that has a straight section (e.g., a rectangular shape and/or an oval shape) may break the vacuum when the straight section engages with the uneven and/or rough section of the container 102. For example, when the straight section of the skirt 302 engages with the rough and/or uneven surface of the container 102, the difference in height of the rough and/or uneven surface can prevent most or all of the straight section from forming a seal (e.g., a vacuum). However, a skirt 302 with an elliptical shape has a continuous curve such that attaching to the uneven and/or the rough surface will not prevent the suction cup 110 from forming a vacuum (e.g., because only a small portion of the skirt 302 the is positioned on two different heights may be prevented from forming the seal (e.g., the vacuum)).

The suction cup 110 can include fasteners 602. The fasteners 602 can attach various components of the suction cup 110. For example, the fasteners 602 can attach the back plate 314 to the engagement plate 304. The fasteners 602 can additionally or alternatively connect the skirt 302 to the engagement plate 304. As shown in FIG. 8, the fasteners 602 can be positioned in slots 802. The slots 802 can include features to engage with the fasteners 602. For example, the slots 802 can include threading.

As shown in FIGS. 4A through 8, the engagement plate 304 can include a proximal side 305 (e.g., a proximal surface) and a distal side 307 (e.g., a distal surface). The proximal side 305 can be or include the engagement surface 306. The engagement plate 304 can include multiple apertures 310. For example, the engagement plate 304 can include a primary aperture 310a (e.g., a primary aperture) and one or more secondary apertures 310b and 310c. As shown in the FIGS. the engagement plate 304 include two secondary apertures (e.g., secondary apertures 310b and 310c), however, the engagement plate 304 can include no secondary apertures, one secondary aperture, or more than two secondary apertures. One or more of the apertures 310 can extend some or all of the way through the engagement plate 304. For example, the primary aperture 310a can extend from the proximal side 305 (e.g., the engagement surface 306) of the engagement plate 304 to a distal side 307 of the engagement plate 304. Additionally or alternatively, the secondary apertures 310b and/or 310c can extend a portion of the distance between the proximal side 305 and the distal side 307. However, the secondary apertures 310b and/or 310c can extend the entire way from the proximal side 305 to the distal side 307.

The stem 316 can include a conduit 402. The conduit 402 can extend through the stem 316 (e.g., from an attachment end 404 to a pivoting end 406). The conduit 402 of the stem 316 can be aligned with the primary aperture 310a of the engagement plate 304 to facilitate the flowing of air from the engagement surface 306. For example, the conduit 402 can flow air from between the engagement surface 306 and the container 102 when the skirt 302 is positioned against the container 102. The attachment end 404 can be attached to the pump 112, for example, via a hose. For example, the attachment end 404 can include a flared portion that can receive and secure a hose. The pivoting end 406 of the stem 316 can be positioned within the engagement plate 304 (e.g., within an aperture 310). The pivoting end 406 can be shaped to allow for pivoting of the engagement plate 304 relative to the stem 316. For example, the pivoting end 406 can be ball-shaped or otherwise at least partially rounded.

The engagement plate 304 can pivot about a pitch and/or a yaw axis. The pivoting of the engagement plate 304 can allow the suction cup 110 to engage with angled surfaces (e.g., angled surfaces of the container 102). For example, the container 102 may include surfaces that extend upwardly and outwardly to facilitate nesting with other containers 102. In some embodiments, a gasket 408 can be positioned between the pivoting end 406 and the aperture 310. The gasket 408 can prevent air from escaping (e.g., can prevent air from escaping through a gap between the pivoting end 406 and the aperture 310).

In various embodiments, the stem 316 can include one or more openings 410 that can receive a pin 412. The pin 412 can allow pivoting of the engagement plate 304 when the pin 410 is positioned in the opening (e.g., pivoting about the yaw, roll, and/or pitch axis). For example, the pin 412 can allow pivoting of the engagement plate 304 up to eight degrees. The pin 412 can additionally or alternatively prevent rotation of the engagement plate 304 relative to the stem 316 (e.g., prevent rotation of the engagement plate 304 about a roll axis). For example, when the pin 412 is positioned in the opening 410, the engagement plate 304 can be prevented from rotating about a longitudinal axis of the stem 316 (e.g., about the roll axis of the stem 316). However, removing the pin 412 from the opening 410 can allow rotation of the stem 316 in the aperture 310. As discussed herein, the rotation of the stem 316 can move the holes 414 into and/or out of alignment with the passages 416. Rotating the stem 316 can include removing the pin 412 from a first opening 410, rotating the pin 412, and inserting the pin 412 into another opening 410.

In some embodiments, the pin 412 can additionally or alternatively prevent pivoting of the engagement plate 304 about the pitch and/or the yaw axis. For example, the pin 412 can prevent rotation of the engagement plate 304 about the yaw axis. However, the pin 412 can prevent rotation of the engagement plate 304 about the pitch axis. In various embodiments, the stem 316 can be rotated and the pin 412 inserted into a different opening 410 to change the axis that the engagement plate 304 is prevent from rotating about. For example, the pin 412 can prevent the engagement plate 304 from rotating about the yaw axis when the pin 412 is positioned in a first opening 410 and can prevent the engagement plate 304 from rotating about the pitch axis when the pin 412 is in a second opening 410

The stem 316 can include holes 414 (e.g., as shown in FIG. 7). The holes 414 can align with passages 416 (e.g., as shown in FIG. 8) in the engagement plate 304. The passages 416 can extend between the primary aperture 310a and the secondary apertures 310b and 310c. The passages 416 can allow air to flow between the apertures 310 (e.g., between the primary aperture 310a and the secondary apertures 310b and 310c) and/or between the secondary apertures 310b and 310c and the holes 414 of the stem 316. The stem 316 can be moveable (e.g., rotatable) between an open configuration and a closed configuration. In the open configuration, the holes 414 can be aligned with the passages 416 (e.g., as shown in FIG. 6) and air can flow through the secondary apertures 310b and 310c. The stem 316 can be rotated from the open configuration to the closed configuration. For example, the pin 412 can be removed from a first opening 410, the stem 316 can be rotated (e.g., in the primary aperture 310a), and the pin 412 can be inserted in a second opening 410. In the closed configuration, the holes 414 can be out of alignment with the passages 416 (e.g., as shown in FIG. 5). When the holes 414 are no longer aligned (e.g., when the stem 316 is in the closed configuration) air may be prevented from flowing through the secondary apertures 310b and 310c.

The covers 312 can be supported by supports 418 positioned in the apertures 310 (e.g., secondary apertures 310b and 310c). The supports 418 can be positioned in the apertures 310 when the holes 414 are no longer aligned with the passages 416 (e.g., when no air is flowing through the secondary apertures 310b and 310c). The supports 418 can provide support for the covers 312, for example, when the covers 312 engage with the containers 102. The supports 418 can be positioned in the apertures 310 such that the covers 312 extend beyond the plane of the engagement surface 306. For example, the covers 312 can extend beyond the plane of the engagement surface 306 such that when the covers 312 compress, the engagement surface 306 can engage with the containers 102.

Figure 9:
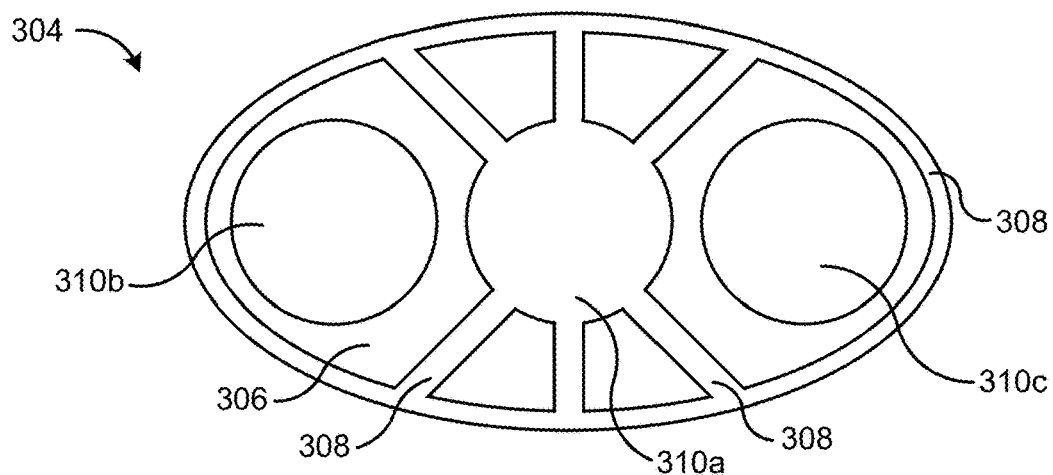
FIG. 9 shows a front view of the engagement plate of FIG. 8, according to various embodiments.
Figure 10:
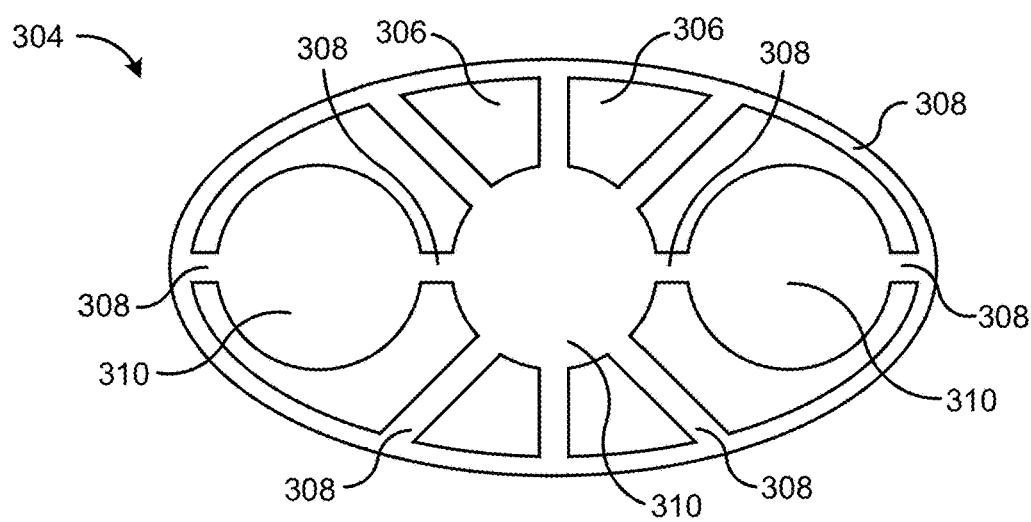
FIG. 10 shows a front view of another engagement plate for use with the suction cup of FIG. 3, according to various embodiments.
Figure 11:
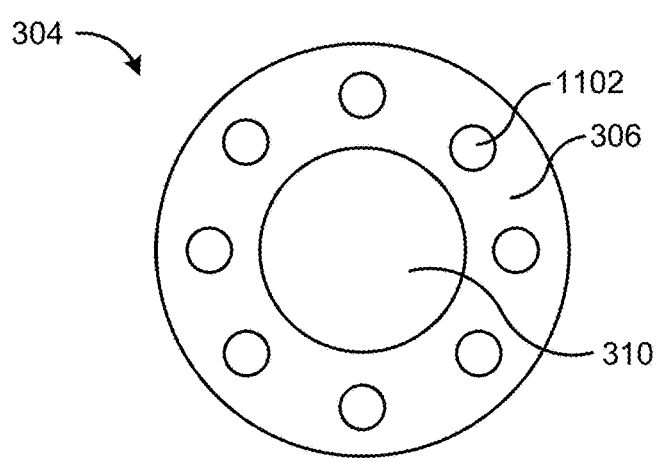
FIG. 11 shows the front view of another engagement plate for use with the suction cup of FIG. 3, according to various embodiments.

Turning to FIGS. 9 through 11, front views of example engagement plates 304 are shown. FIGS. 9 and 10 show engagement plates 304 having a primary aperture 310a and two secondary apertures 310b and 310c. The engagement plates 304 include an engagement surface 306 and channels 308. As shown in FIG. 9, the channels 308 can extend from the primary aperture 310a to the periphery of the engagement surface 306 (e.g., a periphery of the engagement plate 304). In various embodiments, a channel 308 can extend around the periphery of the engagement surface 306 and connect with the channels 308 extending from the primary aperture 310a. Air can flow through the channels 308 from the periphery of the engagement surface 306 to the primary opening 310a. The air flowing through the channels 308 can allow the suction cup 110 to maintain a vacuum hold when the engagement surface 306 is positioned against the container 102 (e.g., when vacuum causes the engagement surface 306 to engage the container 102).

In various embodiments, as shown in FIG. 10, channels 308 can extend between the primary aperture 310a and the secondary apertures 310b and 310c and/or between the secondary apertures 310b and 310c and the periphery of the engagement surface 306. The channels 308 can allow air to flow through the secondary apertures 310b and 310c when the engagement surface 306 is positioned against the container 102. For example, the air can flow from the primary aperture 310a to the secondary apertures 310b and 310c and/or from the periphery of the engagement surface 306 to the secondary apertures 310b and 310c.

In various embodiments, as shown in FIG. 11, the engagement surface 306 of the engagement plate 304 can include areas of friction material 1102. The friction material 1102 can be arranged in a pattern on the engagement surface 306. For example, the friction material 1102 can be arranged in a circular pattern around an aperture 310. In some embodiments, the engagement surface 306 can additionally or alternatively include friction material. For example, the friction material can extend across some or all of the engagement surface 306. The friction material can be positioned on some or all of the engagement surface 306 regardless of the shape (e.g., the cross-sectional shape) of the engagement plate 304 and/or engagement surface 306. For example, the friction material can be positioned on an elliptical cross-section, however, the friction material can be positioned on an engagement surface 306 having a circular cross-section, a square cross-section, on oval cross-section, and/or any suitable cross-sectional shape.

Figure 12:
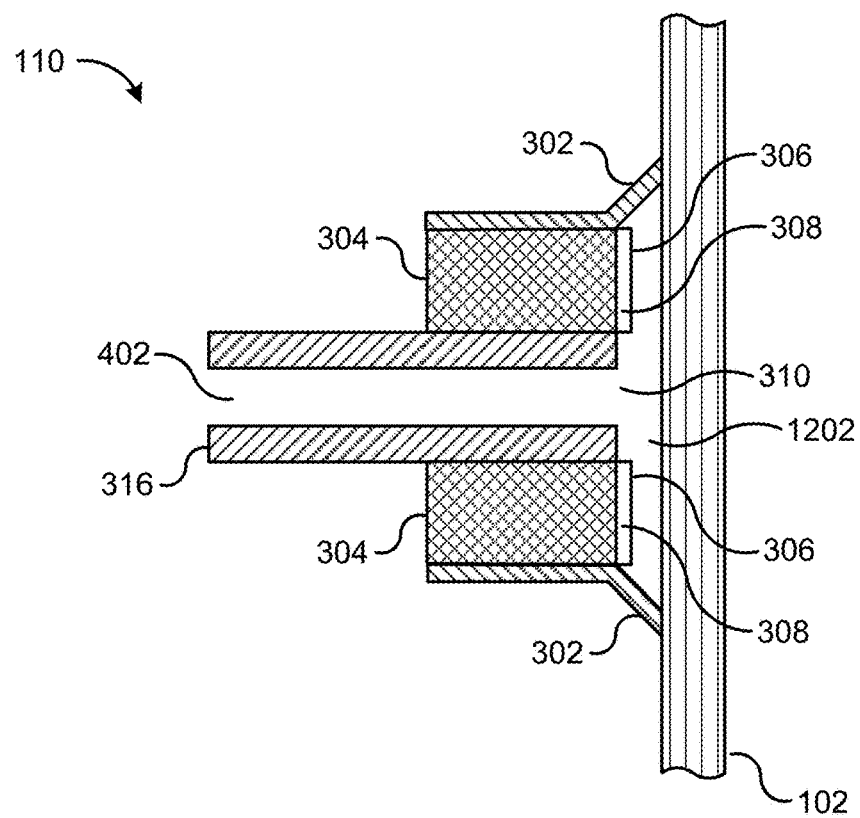
FIGS. 12 and 13 show cross-sectional views of the suction cup of FIG. 3 and a container, according to various embodiments.
Figure 13:
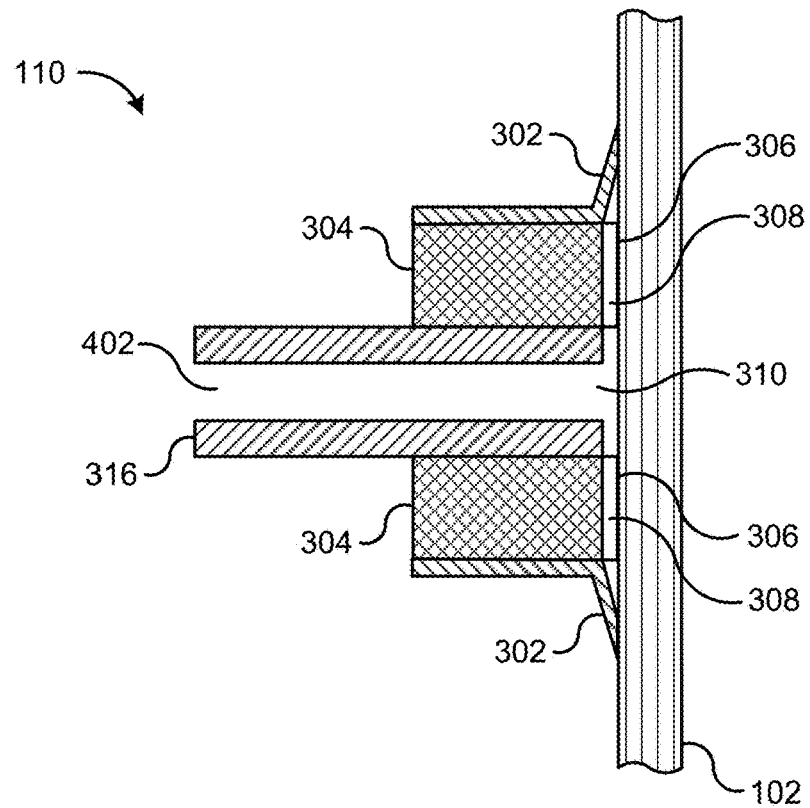

Turning to FIGS. 12 and 13, cross-sectional views of the suction cup 110 and the container 102 are shown. FIG. 12 shows the suction cup 110 in a ready position. In the ready position, the skirt 302 can be engaged with a side of the container 102. There can be a space 1202 (e.g., a space filled with air) between the engagement surface 306 and the container 102. In the ready position, no air or a small amount of air may be flowing through the stem 316. For example, from the space between the engagement surface 306 through the aperture 310 and/or the stem 316.

FIG. 13 shows the suction cup 110 in the vacuum hold position. In the vacuum hold position, the engagement surface 306 can be engaged with the container 102 (e.g., there is no longer a space 1202). In the vacuum hold position, the air can be removed (e.g., via pump 112) from between the engagement surface 306 and the container 102. Removing the air can lower the pressure in the area between the engagement surface 306 and the container 102 (e.g., lower than the atmospheric pressure) and/or generate a vacuum. The vacuum and/or the lower pressure can cause the skirt 302 to compress and the engagement surface 306 to move towards the container 102, for example, until the engagement surface is in contact with the container 102. The channels 308 can allow air to continue to flow from the periphery of the engagement surface 306 to the aperture 310. For example, the engagement surface 306 can be engaged with the container 102 and the channels 308 can leave a gap that allows air to flow from the periphery to the aperture 310.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A container manipulation system, comprising:
   a container manipulation device comprising an attachment area; and
   a suction cup assembly coupled with the attachment area of the container manipulation device, the suction cup assembly comprising:
     an engagement plate defining an aperture and comprising an engagement surface engageable with a surface of a container, the engagement surface comprising friction material and defining channels extending from the aperture to a periphery of the engagement plate; and
     a skirt coupled with the periphery of the engagement plate and comprising a lip engageable with the surface of the container, wherein, when the lip of the skirt is engaged with the surface of the container, an air flow causes a vacuum between the engagement surface and the container.

2. The container manipulation system of claim 1, wherein the suction cup assembly comprises bellows positioned between the skirt and the engagement plate.

3. The container manipulation system of claim 1, wherein, the vacuum causes the engagement surface to engage with the surface of the container.

4. The container manipulation system of claim 3, wherein when the engagement plate is engaged with the surface of the container, air flows through the channels from the periphery of the engagement surface through the aperture.

5. The container manipulation system of claim 1, wherein the engagement plate has an elliptical cross section having a major axis longer than a minor axis.

6. The container manipulation system of claim 1, wherein the aperture defined by the engagement plate is a first aperture and the engagement plate further defines a second aperture.

7. A suction cup assembly, comprising:
   a skirt configured to engage with a surface of a container; and
   an engagement plate having a periphery bounded by the skirt and defining an aperture, the engagement plate comprising an engagement surface configured to engage with the surface of the container, and the engagement surface comprising a friction material and defining a channel in communication with the aperture and extending between the aperture and a periphery of the engagement plate.

8. The suction cup assembly of claim 7, wherein when the skirt is engaged with the surface of the container, air flows through the aperture and generates a vacuum between the engagement surface and the container.

9. The suction cup assembly of claim 8, wherein the vacuum causes the engagement surface to engage with the container, and wherein when the engagement surface is engaged with the container, the air flows through the channel from the periphery of the engagement plate to the aperture.

10. The suction cup assembly of claim 9, wherein the vacuum further causes the skirt to compress to engage the engagement surface with the container.

11. The suction cup assembly of claim 7, wherein the channel is a channel of a plurality of channels defined by the engagement surface, the plurality of channels extending between the aperture and the periphery of the engagement plate.

12. The suction cup assembly of claim 7, wherein the aperture is a first aperture and the engagement plate further defines a second aperture.

13. The suction cup assembly of claim 12, wherein the engagement surface defines a second channel extending between the first and second apertures.

14. The suction cup assembly of claim 7, wherein the engagement plate has an elliptical cross section with a major axis larger than a minor axis.

15. A suction cup assembly, comprising:
a skirt configured to engage with a surface of a container; and
an engagement plate comprising an engagement surface and defining an aperture, the engagement surface defining a channel in communication with the aperture and extending between the aperture and a periphery of the engagement plate, and the engagement surface comprising a friction material and being configured to engage with the surface of the container in response to a vacuum between the engagement surface and the container when the skirt is engaged with the surface of the container, the channel being defined within the friction material.

16. The suction cup assembly of claim 15, wherein the friction material is arranged in a pattern on the engagement surface.

17. The suction cup assembly of claim 15, wherein the friction material comprises rubber, silicon, bakelite, or silicone.

18. The suction cup assembly of claim 15, wherein the engagement plate has an elliptical cross section with a major axis larger than a minor axis.

19. The suction cup assembly of claim 15, wherein the aperture is a first aperture and the engagement plate further defines a second aperture, and wherein the second aperture is configured to receive a cover comprising the friction material.

20. The suction cup assembly of claim 15, wherein, in response to the vacuum between the engagement surface and the container, the skirt is configured to compress until the engagement surface is engaged with the container.

\* \* \* \* \*